United States Patent
Narita et al.

(10) Patent No.: US 8,609,898 B2
(45) Date of Patent: Dec. 17, 2013

(54) SEPARATION REAGENT OF PLATINUM GROUP METAL, METHOD FOR SEPARATING AND RECOVERING PLATINUM GROUP METAL, AND AMIDE-CONTAINING TERTIARY AMINE COMPOUND

(75) Inventors: Hirokazu Narita, Tsukuba (JP); Mikiya Tanaka, Inashiki-gun (JP); Kazuko Morisaku, Namegata (JP)

(73) Assignee: National Institute of Advanced Industrial Science and Technology (JP)

( * ) Notice: Subject to any disclaimer, the term of this patent is extended or adjusted under 35 U.S.C. 154(b) by 415 days.

(21) Appl. No.: 13/013,490

(22) Filed: Jan. 25, 2011

(65) Prior Publication Data
US 2011/0113927 A1 May 19, 2011

Related U.S. Application Data

(60) Division of application No. 12/640,077, filed on Dec. 17, 2009, now abandoned, which is a continuation-in-part of application No. PCT/JP2008/061646, filed on Jun. 26, 2008.

(30) Foreign Application Priority Data

Jun. 26, 2007 (JP) ................. 2007-167554

(51) Int. Cl.
C07C 233/05 (2006.01)
C22B 61/00 (2006.01)

(52) U.S. Cl.
USPC ............. 564/159; 564/197; 75/711; 75/721

(58) Field of Classification Search
USPC ............. 564/159, 197; 75/711, 721
See application file for complete search history.

(56) References Cited

U.S. PATENT DOCUMENTS

| 2,411,662 | A | | 11/1946 | Hans Gysin et al. | ......... 564/160 |
| 4,105,742 | A | | 8/1978 | Edwards et al. | ............ 423/22 |
| 4,331,634 | A | * | 5/1982 | Shanton et al. | ............ 423/22 |
| 4,390,366 | A | | 6/1983 | Lea et al. | ............ 75/101 |

FOREIGN PATENT DOCUMENTS

| DE | 2302150 | * | 7/1973 |
| JP | 49-27401 | | 3/1974 |
| JP | 53-16368 | | 2/1978 |
| JP | 1-30896 | | 6/1989 |
| JP | 04-143231 | | 5/1992 |
| JP | 07-310129 | | 11/1995 |
| JP | 08-158088 | | 6/1996 |
| JP | 08-193228 | | 7/1996 |
| JP | 09-279264 | | 10/1997 |
| JP | 10-102156 | | 4/1998 |
| JP | 2004-332041 | | 11/2004 |
| WO | WO 2005/083131 | | 9/2005 |

OTHER PUBLICATIONS

Erne et al, Helv. Chimi. Actta, vol. 63, 2264-2270, 1980.*
English abstract of DE 2303150, 1973.*
International Search Report mailed Sep. 16, 2008 in corresponding PCT International Application No. PCT/JP2008/061646.
Daniel Erne et al. "LipoRhilic Amides of EDTA, NTA and Iminodiacetic Acid as Ionophores for Alkaline Earth Metal Cations," Belvetica Chimica Acta, vol. 63, Fasc. 8 (1980), pp. 2264-2270.
Nan Yang et al., Synthesis, characterization of 2-(bis-dibutylcarbamoylmethyl-amino)-N, N-dibutyl-acetamide (L) lanthanide picrate complexes (In=Nd, Eu, Tb) and the crystal structure of [Tb(pic)₃L], Journal of Molecular Structure, 657 (2003), pp. 177-183.
Hirokazu Narita et al., "The first effective extractant for trivalent rhodium in hydrochloric acid solution," The Royal Society of Chemistry, Chem. Commun., 2008, pp. 5921-5923.

* cited by examiner

*Primary Examiner* — Shailendra Kumar
(74) *Attorney, Agent, or Firm* — Ostrolenk Faber LLP (57) ABSTRACT

The present invention provides a novel separation reagent capable of obtaining a high extraction % of rhodium in a chlorine-based acid solution, which has never existed heretofore, and a method for separating and recovering a platinum group metal using the same. An organic phase composed of an amide-containing tertiary amine separation reagent represented by the structural formula shown below is brought into contact with an acid solution containing a platinum group metal, thereby extracting rhodium, platinum and palladium with the organic phase. Among the metals extracted with the organic phase, rhodium is selectively back-extracted with a highly-concentrated hydrochloric acid solution, while palladium and platinum are back-extracted with a highly-concentrated nitric acid solution:

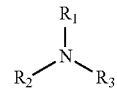

wherein at least one of $R_1$, $R_2$ and $R_3$ represents an amide group represented by:

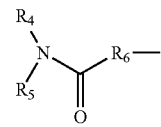

$R_1$ to $R_3$ other than the amide group and $R_4$ to $R_6$ represent a group selected from an optionally branched chain hydrocarbon group of 1 to 18 carbon atoms, an alicyclic hydrocarbon group of 1 to 10 carbon atoms, and an aromatic hydrocarbon group of 1 to 14 carbon atoms.

10 Claims, 5 Drawing Sheets

SEPARATION REAGENT OF PLATINUM GROUP METAL, METHOD FOR SEPARATING AND RECOVERING PLATINUM GROUP METAL, AND AMIDE-CONTAINING TERTIARY AMINE COMPOUND

CROSS-REFERENCE TO RELATED APPLICATIONS

The present application is a divisional of U.S. patent application Ser. No. 12/640,077, filed on Dec. 17, 2009, now abandoned, which is a continuation-in-part of International Application PCT/JP2008/061646, filed on Jun. 26, 2008, which designated the United States and published in a language other than English, which claims priority from Japanese Patent Application 2007-167554, filed Jun. 26, 2007. The contents of these applications are herein wholly incorporated by reference.

TECHNICAL FIELD

The present invention relates to a separation reagent of a platinum group metal including rhodium, platinum and palladium, a method for separating and recovering a platinum group metal using the same, and an amide-containing tertiary amine compound.

BACKGROUND ART

Platinum group metals such as platinum, palladium and rhodium are used in a lot of electric appliances, in addition to being used as industrial catalysts and automobile exhaust gas purifying catalysts. Although these platinum group metals are expensive and have been recycled heretofore by being recovered after use, it cannot be said that the techniques are satisfactory. Recently, the importance of recycling has increased furthermore by taking resource conservation into consideration.

Heretofore, a lot of methods such as a precipitation method (Patent Document 1), an ion exchange method (Patent Document 2), an electrolytic deposition method (Patent Document 3) and a solvent extraction method have been proposed for recovery of platinum group metals and have been carried out. Among these methods, a solvent extraction method has been widely employed because of its economical efficiency and operability.

However, since an effective separation reagent for rhodium does not exist in the separation of platinum group metals using the solvent extraction method, rhodium has been recovered from the separation residue after being separated from other metals (Patent Documents 4 to 6). However, it is inefficient from an economical point of view to leave rhodium, which is the most expensive of the platinum group metals, until the end of the process.

Selective extraction of palladium with a sulfur-containing organic compound, dialkyl sulfide (DAS), has widely been used for mutual separation of palladium and platinum by the solvent extraction method (Patent Document 7). Among DAS, dihexyl sulfide (DHS) is commonly used but is insufficient in an extraction %, and it is pointed out that the sulfide groups are likely to be oxidized.

The present inventors have found that it is possible to extract palladium within a short time when compared with the case of using DHS which has been used heretofore, and to separate other platinum group metals and a base metal, and also to separate and recover palladium with high efficiency by using a sulfur-containing diamide compound such as thiodiglycolamide, 3,3'-thiodipropionamide or 3,6-dithiaoctanediamide in place of conventional DHS as an extractant of palladium (Patent Document 8). However, rhodium cannot be extracted by the extractants.

Patent Document 1:
Japanese Unexamined Patent Application, First Publication No. Hei 10-102156
Patent Document 2:
Japanese Unexamined Patent Application, First Publication No. Hei 7-310129
Patent Document 3:
Japanese Unexamined Patent Application, First Publication No. Hei 6-300854
Patent Document 4:
Japanese Examined Patent Application, Second Publication No. Hei 1-30896
Patent Document 5:
Japanese Unexamined Patent Application, First Publication No. Hei 8-193228
Patent Document 6:
Japanese Unexamined Patent Application, First Publication No. 2004-332041
Patent Document 7:
Japanese Unexamined Patent Application, First Publication No. Hei 9-279264
Patent Document 8:
International Publication No. WO 2005/083131 pamphlet

DISCLOSURE OF THE INVENTION

Problems to be Solved by the Invention

Under these circumstances, the present invention has been made and an object thereof is to provide a separation reagent capable of selectively separating and recovering rhodium, which has never existed heretofore in the field of solvent extraction, and a method for separating and recovering a platinum group metal into which the separation reagent is introduced.

Means for Solving the Problems

The present inventors have conducted intensive research so as to achieve the above object, resulting in findings that, when an amide-containing tertiary amine compound is brought into contact with an acid solution containing a platinum group metal, a platinum group metal can be extracted with, particularly, a high extraction % which has never been achieved, is obtained with respect to rhodium, and also rhodium can be selectively back-extracted by bringing an organic phase after extracting the platinum group metal into contact with a highly-concentrated hydrochloric acid solution, and also other platinum group metals can be back-extracted by being brought into contact with a highly-concentrated nitric acid solution.

The present invention has been completed based on these findings and provides:

(1) A platinum group metal separation reagent including, as an active ingredient, an amide-containing tertiary amine compound represented by the general formula shown below:

[Chemical Formula 1]

wherein a least one of $R_1$, $R_2$ and $R_3$ represents an amide group represented by:

[Chemical Formula 2]

and $R_1$ to $R_3$ other than the amide group and $R_4$ to $R_6$ represent a group selected from an optionally branched chain hydrocarbon group of 1 to 18 carbon atoms, an alicyclic hydrocarbon group of 1 to 10 carbon atoms and an aromatic hydrocarbon group of 1 to 14 carbon atoms;

(2) A method for separating a platinum group metal, which comprises bringing an acidic aqueous phase containing rhodium, platinum and palladium into contact with an organic phase containing the platinum group metal separation reagent according to (1), thereby extracting rhodium, platinum and palladium into the organic phase;

(3) A method for recovering rhodium, which comprises back-extracting rhodium, platinum and palladium extracted into the organic phase according to (2) with a highly-concentrated hydrochloric acid solution to obtain an aqueous solution containing rhodium;

(4) A method for recovering rhodium, platinum and palladium, which comprises back-extracting rhodium, platinum and palladium extracted into the organic phase according to (2) with a highly-concentrated nitric acid solution to obtain an aqueous solution containing rhodium, platinum and palladium;

(5) A method for separating and recovering rhodium, platinum and palladium wherein a platinum group metal is separated and recovered from a solution to be treated containing at least rhodium, platinum and palladium, the method comprising:

a first step of bringing an acidic solution to be treated containing at least rhodium, platinum and palladium into contact with an organic phase containing the platinum group metal separation reagent according to (1), thereby separating rhodium, platinum and palladium from the acidic solution to be treated, a second step of bringing the resulting organic phase containing rhodium, platinum and palladium into contact with a highly-concentrated hydrochloric acid solution, thereby recovering rhodium, a third step of bringing a highly-concentrated nitric acid solution into contact with the organic phase after separation of rhodium, thereby recovering platinum and palladium, a fourth step of bringing an organic phase containing a thiodiglycolamide separation reagent into contact with the resultant aqueous solution containing platinum and palladium, thereby separating palladium and leaving platinum in the aqueous solution, and a fifth step of bringing a hydrochloric acid solution containing thiourea or an ammonia solution into contact with the resultant organic phase containing palladium, thereby recovering palladium;

(6) An amide-containing tertiary amine compound represented by the general formula shown below:

[Chemical Formula 1]

wherein $R_1$ represents an amide group represented by:

[Chemical Formula 2]

$R_2$ and $R_3$ represent an optionally branched chain hydrocarbon group of 1 to 11 carbon atoms, $R_4$ represents an optionally branched chain hydrocarbon group of 1 to 6 carbon atoms, $R_5$ represents an optionally branched chain hydrocarbon group of 6 to 10 carbon atoms, and $R_6$ represents an optionally branched chain hydrocarbon group of 1 to 6 carbon atoms; and (7) An amide-containing tertiary amine compound represented by the general formula shown below:

[Chemical Formula 1]

wherein $R_1$ and $R_2$ represent an amide group represented by:

[Chemical Formula 2]

$R_3$ represents an optionally branched chain hydrocarbon group of 4 to 8 carbon atoms, $R_4$ represents an optionally branched chain hydrocarbon group of 1 to 6 carbon atoms, $R_5$ represents an optionally branched chain hydrocarbon group of 6 to 10 carbon atoms, and $R_6$ represents an optionally branched chain hydrocarbon group of 1 to 6 carbon atoms.

Effects of the Invention

According to the present inventions (1) to (5), rhodium, platinum and palladium can be extracted from an acidic solution to be treated containing a platinum group metal including rhodium, platinum and palladium by using an amide-containing tertiary amine compound represented by the general formula shown above as a separation reagent; and also rhodium can be selectively recovered by bringing a separation reagent-containing solution after extraction of the metal into contact with a highly-concentrated hydrochloric acid solution; and also platinum and palladium can be isolated by bringing the separation reagent-containing solution into contact with a highly-concentrated nitric acid solution.

BEST MODE FOR CARRYING OUT THE INVENTION

The present inventions (1) to (5) uses, as a separation reagent for separating platinum group metals from an acidic solution containing rhodium, platinum and palladium, an amide-containing tertiary amine compound represented by the general formula shown below:

[Chemical Formula 1]

wherein at least one of $R_1$, $R_2$ and $R_3$ represent an amide group represented by:

[Chemical Formula 2]

and $R_1$ to $R_3$ other than the amide group and $R_4$ to $R_6$ represent a group selected from an optionally branched chain hydrocarbon group of 1 to 18 carbon atoms, an alicyclic hydrocarbon group of 1 to 10 carbon atoms, and an aromatic hydrocarbon group of 1 to 14 carbon atoms.

In the amide-containing tertiary amine compound as the separation reagent, the number of substituents of chemical formula 2 in $R_1$ to $R_3$ is at least 1, preferably 2 or more, and most preferably 3 in view of an extractability of Rh.

$R_1$ to $R_3$ other than the amide group are preferably optionally branched chain hydrocarbon groups of 1 to 18 carbon atoms, and more preferably optionally branched chain hydrocarbon group of 1 to 11 carbon atoms. $R_4$ is preferably an optionally branched chain hydrocarbon group of 1 to 18 carbon atoms, and more preferably an optionally branched chain hydrocarbon group of 1 to 6 carbon atoms. $R_5$ is preferably an optionally branched chain hydrocarbon group of 1 to 18 carbon atoms, and more preferably an optionally branched chain hydrocarbon group of 3 to 13 carbon atoms. $R_6$ is preferably an optionally branched chain hydrocarbon group of 1 to 18 carbon atoms, and more preferably an optionally branched chain hydrocarbon group of 1 to 6 carbon atoms.

Examples of the chain hydrocarbon group include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, isopropyl, isobutyl, s-butyl, t-butyl, isopentyl, neopentyl, t-pentyl, 2-ethylhexyl, vinyl, allyl, 1-propenyl, isopropenyl, 1-butenyl, 2-butenyl, 2-methylallyl, 1-peptynyl, 1-hexenyl, 1-heptenyl, 1-octenyl and 2-methyl-1-propenyl groups; examples of the alicyclic hydrocarbon group include cyclobutyl, cyclopentyl, cyclohexyl, cyclopeptyl, cyclooctyl, cyclononyl, cyclodecyl, cyclohexenyl, cyclohexadienyl, cyclohexatrienyl, cyclooctenyl and cyclooctadienyl groups; and examples of the aromatic hydrocarbon group include phenyl, naphthyl, anthryl, tolyl, xylyl, cumenyl, benzyl, phenethyl, styryl, cinnamyl, biphenylyl and phenanthryl groups.

Specific examples of the amide-containing tertiary amine represented by general formula shown above as the separation reagent include N-n-hexyl-bis(N-methyl-N-n-octyl-ethylamide)amine which is represented by the general formula of [Chemical Formula 1] and [Chemical Formula 2] shown above in which $R_1=R_2=R_4R_5NC(O)R_6$, $R_3$=n-$C_6H_{13}$, $R_4$=$CH_3$, $R_5$=n-$C_8H_{17}$, and $R_6$=$CH_2$, N-di-n-hexyl-(N-methyl-N-n-octyl-ethylamide)amine and tris(N-methyl-N-n-octyl-ethylamide)amine.

The amide-containing tertiary amine represented by the general formula shown above can be synthesized with reference to the method described in Helvetica Chimica Acta, Vol. 63, pp. 2264-2270 (1980) (hereinafter referred to as "Non-Patent Document 1", the disclosure of which is incorporated by reference herein).

The present application also provides two novel kinds of amide-containing tertiary amine compounds.

A first amide-containing tertiary amine compound is a compound represented by chemical formula 1 wherein $R_1$ is an amide group represented by chemical formula 2, $R_2$ and $R_3$ are optionally branched chain hydrocarbon groups of 1 to 11 carbon atoms, and preferably 4 to 8 carbon atoms, $R_4$ is an optionally branched chain hydrocarbon group of 1 to 6 carbon atoms, $R_5$ is an optionally branched chain hydrocarbon group of 6 to 10 carbon atoms, and $R_6$ is an optionally branched chain hydrocarbon group of 1 to 6 carbon atoms, and preferably 1 to 3 carbon atoms.

The second amide-containing tertiary amine compound is a compound represented by chemical formula 1 wherein $R_1$ and $R_2$ are amide groups represented by chemical formula 2, $R_3$ is an optionally branched chain hydrocarbon group of 4 to 8 carbon atoms, and preferably 5 to 7 carbon atoms, $R_4$ is an optionally branched chain hydrocarbon group of 1 to 6 carbon atoms, and preferably 1 to 3 carbon atoms, $R_5$ is an optionally branched chain hydrocarbon group of 6 to 10 carbon atoms, and $R_6$ is an optionally branched chain hydrocarbon group of 1 to 6 carbon atoms, and more preferably 1 to 3 carbon atoms.

The method for separating and recovering rhodium, platinum and palladium from a solution containing a platinum group metal including rhodium, platinum and palladium using the separation reagent of the present invention will be explained with reference to the accompanying drawings.

Figure 1:
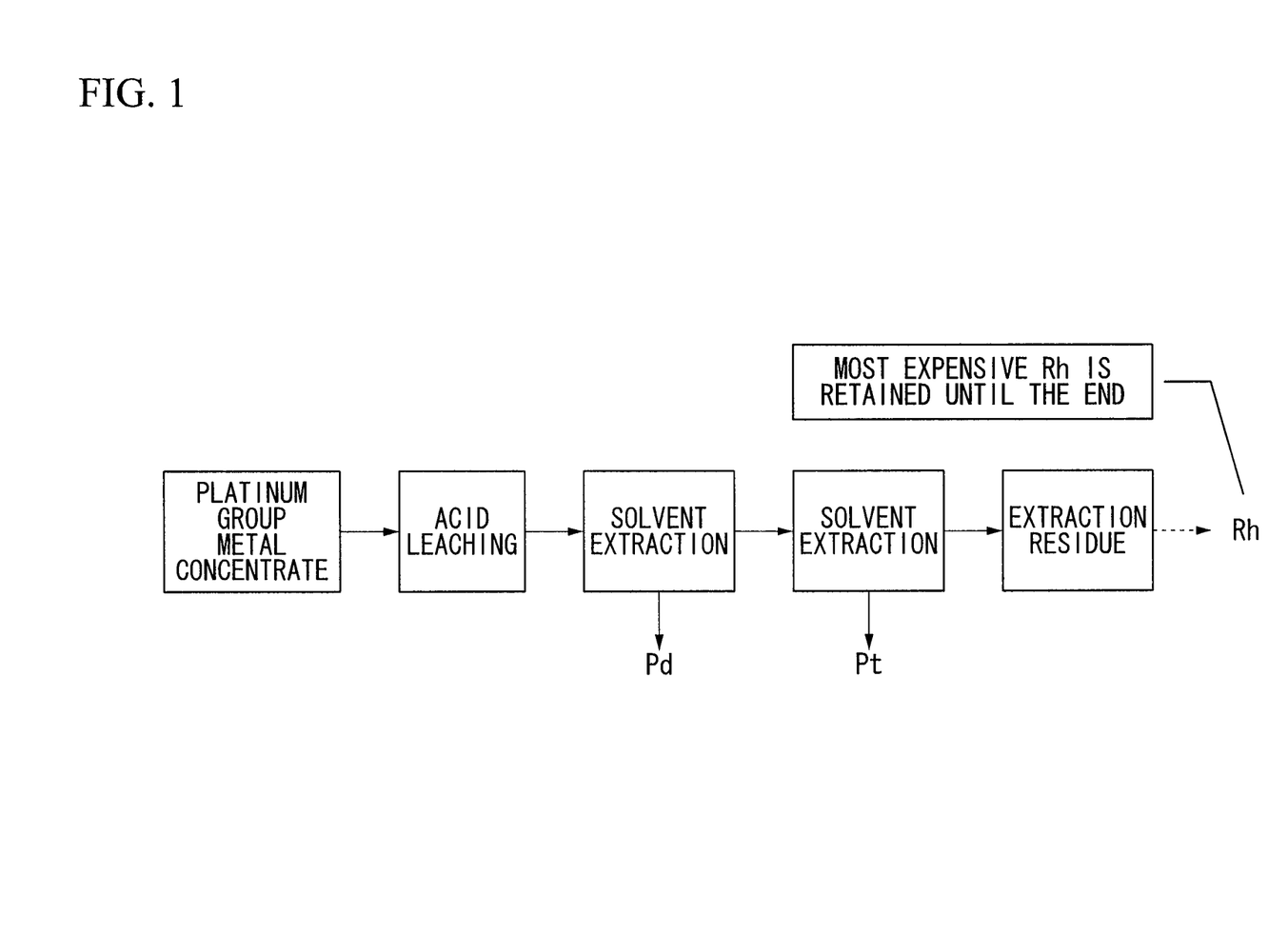
FIG. 1 is a flow chart showing the outline of a conventional separation and recovery process.
Figure 2:
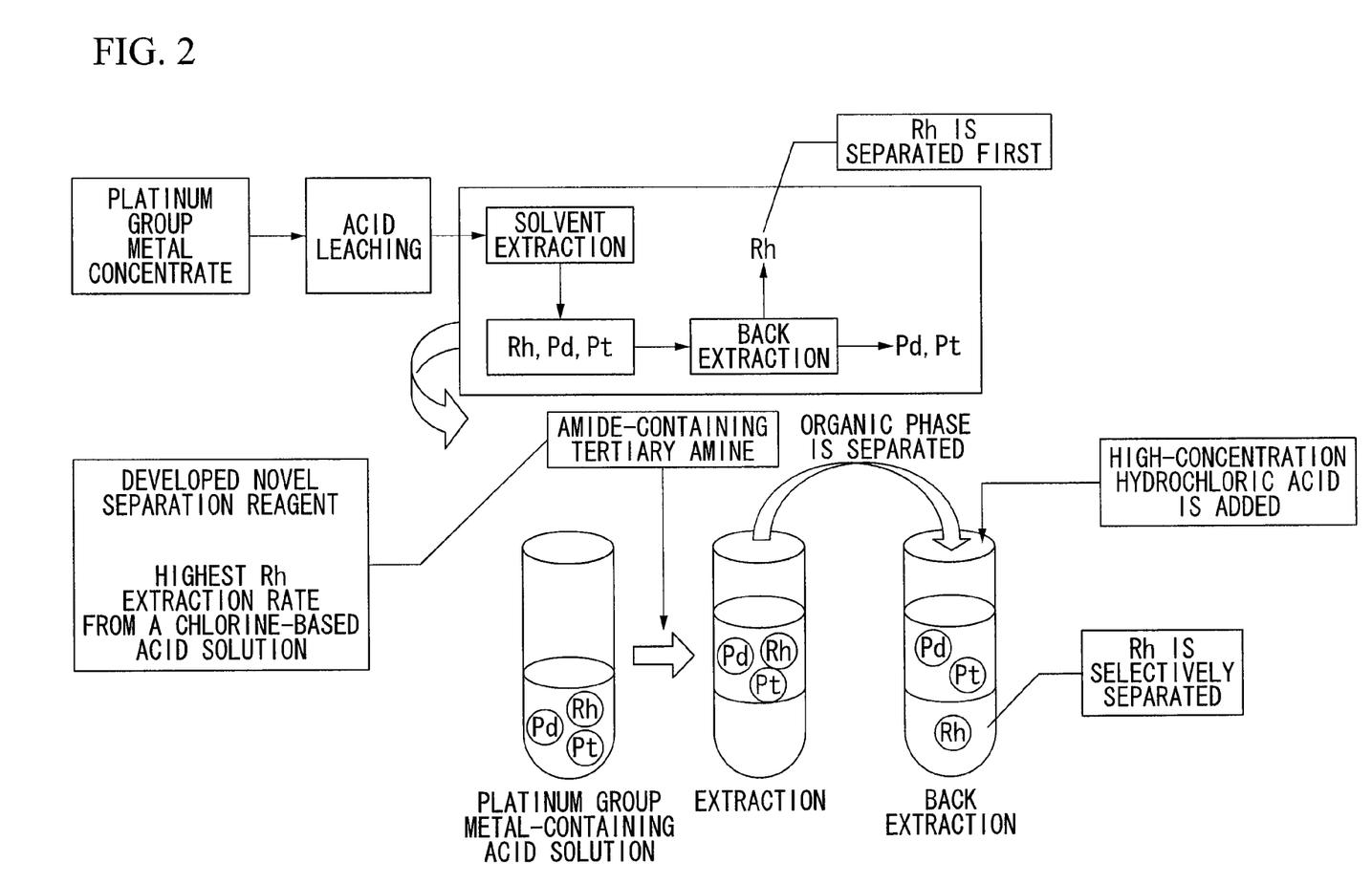
FIG. 2 is a flow chart showing the outline of a separation and recovery process according to the method of the present invention.

FIG. 1 and FIG. 2 respectively show the outline of the above-described conventional separation and recovery process and that of a separation and recovery process according to the method of the present invention.

As shown in FIG. 1, in the conventional separation and recovery process, an organic phase containing a palladium extractant, such as dialkyl sulfide, is brought into contact with an acidic solution to be treated containing rhodium, platinum and palladium, thereby extracting palladium, and then an organic phase containing a platinum extractant, such as tributylphosphoric acid, is brought into contact with the solution containing platinum and rhodium after the extraction of palladium, thereby recovering rhodium from the remaining extraction residue. According to this method, rhodium which is the most expensive among the platinum group metals is left until the end of the process.

In contrast, as shown in FIG. 2, according to the separation and recovery process of the present invention, when a separation reagent including an amide-containing tertiary amine compound represented by the general formula shown above is used, it is possible to extract rhodium, platinum and palladium from an acidic solution to be treated containing rhodium, platinum and palladium into an extracting solution containing the separation reagent.

Next, it becomes possible to selectively separate only rhodium, first, through back extraction by bringing the organic phase containing rhodium, platinum and palladium after the extraction of the metals, into contact with a highly-concentrated hydrochloric acid solution.

Subsequently, platinum and palladium can be separated and recovered through back extraction by bringing the organic phase after separating rhodium into contact with a highly-concentrated nitric acid solution.

When the organic phase containing rhodium, platinum and palladium is brought into contact with a highly-concentrated nitric acid solution, platinum, palladium and rhodium can be separated and recovered from the organic phase through back extraction.

The "highly-concentrated" of the highly-concentrated hydrochloric acid solution and the highly-concentrated nitric acid solution means that the concentration of the acid therein is higher than that of the acid used in the foregoing extraction of the metals.

In order to extract rhodium, platinum and palladium from an acidic solution containing rhodium, platinum and palladium using a separation reagent including an amide-containing tertiary amine compound represented by the general formula shown above of the present invention, it is necessary to prepare an extracting solution containing the separation reagent in advance. The extracting solution can be prepared by dissolving the separation reagent in a hydrophobic organic solvent, for example, an aliphatic hydrocarbon such as n-dodecane, an alcohol such as 2-ethyl-1-hexanol, an aliphatic chloride such as chloroform, or an aromatic hydrocarbon such as benzene. The concentration of the separation reagent in these solvents can be appropriately determined.

The solution to be treated used in the method for separating and recovering rhodium, platinum and palladium of the present invention may be a solution containing at least rhodium, platinum and palladium. For example, the solution to be treated may contain metals other than the platinum group metal including rhodium, platinum and palladium.

When the solution to be treated contains metals other than the platinum group metal, a hydrochloric acid solution containing a platinum group metal such as rhodium, platinum and palladium and other metals is neutralized and thus metals other than the platinum group metal coexisting in the solution are removed by separating as a precipitate.

In this impurity neutralizing and removing step, the pH is adjusted within a range from 2.8 to 3.3, and this step is more preferably performed by adjusting the pH after an excess oxidizing agent is removed by air venting.

The solution obtained by the above pre-treatment contains a platinum group metal such as rhodium, platinum and palladium, and a hydrochloric acid solution containing the platinum group metal is prepared in the subsequent step so that it contains a platinum group metal of a molar concentration which is ½ or less that of an amide-containing tertiary amine compound represented by the general formula of [Chemical Formula 1] and [Chemical Formula 2] shown above in the extracting solution to be brought into contact with the hydrochloric acid solution.

The method of the present invention will be explained in more detail in the order of steps.

(First Step)

An aqueous phase composed of a hydrochloric acid solution containing rhodium, platinum and palladium is brought into contact with an organic phase of an extracting solution containing the platinum group metal separation reagent including the amide-containing tertiary amine compound, and thus rhodium, platinum and palladium are separated by extracting rhodium, platinum and palladium from the aqueous phase into the organic phase.

(Second Step)

Next, the organic phase containing rhodium, platinum and palladium obtained by the above operation is brought into contact with a highly-concentrated hydrochloric acid solution, thereby recovering rhodium. In the step, only rhodium among the platinum group metal separated into the organic phase can be back-extracted and recovered as an aqueous solution by bringing the organic phase into contact with the highly-concentrated hydrochloric acid solution. The highly-concentrated hydrochloric acid solution is preferably a hydrochloric acid solution having a sufficiently higher concentration than that of the hydrochloric acid solution in the first step.

(Third Step)

Platinum and palladium are recovered by bringing the organic phase after separation of rhodium obtained in the above operation into contact with a highly-concentrated nitric acid solution. In the process, platinum and palladium remaining in the organic phase can be back-extracted and recovered as an aqueous solution containing platinum and palladium by bringing the organic phase into contact with a highly-concentrated nitric acid solution. The highly-concentrated nitric acid solution is also preferably a nitric acid solution having a sufficiently higher concentration than that of the hydrochloric acid solution in the first step.

(Fourth Step)

The organic phase containing a thiodiglycolamide separation reagent (a palladium extractant described in Patent Document 8) is brought into contact with the nitric acid solution containing platinum and palladium obtained by the above operation, thereby separating palladium from the nitric acid solution, and platinum is left in the aqueous solution. In the step, only palladium can be separated by selectively extracting into the organic phase by bringing palladium and platinum separated in the third step into contact with the organic solvent containing thiodiglycolamide having excellent oxidation resistance, and thus the remaining platinum can be recovered from the nitric acid solution.

(Fifth Step)

Palladium is recovered by bringing the organic phase containing palladium obtained by the above operation into contact with a hydrochloric acid solution containing thiourea or an ammonia solution. In the step, back extraction is performed by bringing the organic phase containing palladium obtained in the above step into contact with a thiourea-containing hydrochloric acid solution or an ammonia solution, and thus recovering palladium as an aqueous solution containing the palladium.

EXAMPLES

The present invention will be illustrated by Examples which specifically clarify features of the present invention, but the present invention is not limited to these Examples.

Example 1

Synthesis of Separation Reagent

A separation reagent (A): N-n-hexyl-bis(N-methyl-N-n-octyl-ethylamide)amine
(amide-containing tertiary amine represented by general formula (I) shown above in which $R_1=R_2=R_4R_5NC(O)R_6$, $R_3$=n-$C_6H_{13}$, $R_4$=$CH_3$, $R_5$=n-$C_8H_{17}$, and $R_6$=$CH_2$) was synthesized with reference to the method described in Non-Patent Document 1.

Chloroacetyl chloride in diethylether was added dropwise to N-methyloctylamine in diethylether at −2° C. The organic solution was returned to room temperature, followed by stirring for 3 hours. The resulting solution was successively washed with an aqueous 1 mol/L hydrochloric acid solution and water, and then dried over anhydrous sodium sulfate. After removal the solvent under vacuum, the residue was purified by silica gel column chromatography (hexane:ethyl acetate=23:2) to give N-methyl-N-octyl-chloroacetamide (yield: 66.4%).

The analytical results of the resultant product are shown blow.

IR (neat, $vcm^{-1}$): 1658 (C=O).
Elementary analysis: Found: C=59.51%; H=10.00%; N=6.25%.
Calculated for $C_{11}H_{22}NOCl$: C=60.12%; H=10.10%; N=6.37%.
$^1$H-NMR (400 MHz, $CDCl_3$, τppm):
0.88(3H, $CH_2CH_3$); 1.2 to 1.4(10H, $CH_3(CH_2)5$; 1.5 to 1.7(2H, $NCH_2CH_2$), 2.96 and 3.07(3H, $NCH_3$); 3.25 to 3.40 (2H, $NCH_2$); 4.09 (2H, $ClCH_2CO$)

N-methyl-N-octyl-chloroacetamide in chloroform was added dropwise to a mixed solution of hexylamine and triethylamine in chloroform. The mixture was stirred at room temperature for 120 hours, and then stirred at 50° C. for 15 hours. The resulting solution was successively washed with 0.5 mol/L hydrochloric acid, an aqueous 2.5 wt % $Na_2CO_3$ solution and water, and then dried over anhydrous sodium sulfate. After removal of the solvent under vacuum, the residue was purified by silica gel column chromatography (hexane:ethyl acetate=7:3) to give a separation reagent (A) (yield: 60.3%).

Analytical results of the resultant separation reagent (A) are shown below.

IR (neat, $vcm^{-1}$): 1648 (C=O).
Elementary analysis: Found: C=70.55%; H=11.99%; N=8.72%.
Calculated for $C_{28}H_{57}N_3O_2 \cdot \frac{1}{2}H_2O$: C=70.54%; H=12.26%; N=8.81%.
1H-NMR (400 $MH_z$, $CDCl_3$, σppm):
0.87(9H, $3CH_2CH_3$); 1.2 to 1.4(26H, $10CH_2CH_2$ and $3CH_3CH_2$); 1.4 to 1.6 (6H, $NCH_2CH_2$ and $2CONCH_2CH_2$); 2.67(2H, $NCH2C_2H_5$); 2.89 and 3.03(6H, $2NCH_3$); 3.32(4H, $2CONCH_2$); 3.49(4H, $2NCH_2CO$).

Example 2

Using the separation reagent (A) obtained in Example 1, rhodium, platinum and palladium were separated in the following manner.

The reagent (A) was diluted with chloroform thereby adjusting the concentration to 0.5 mol/L.

Figure 3:
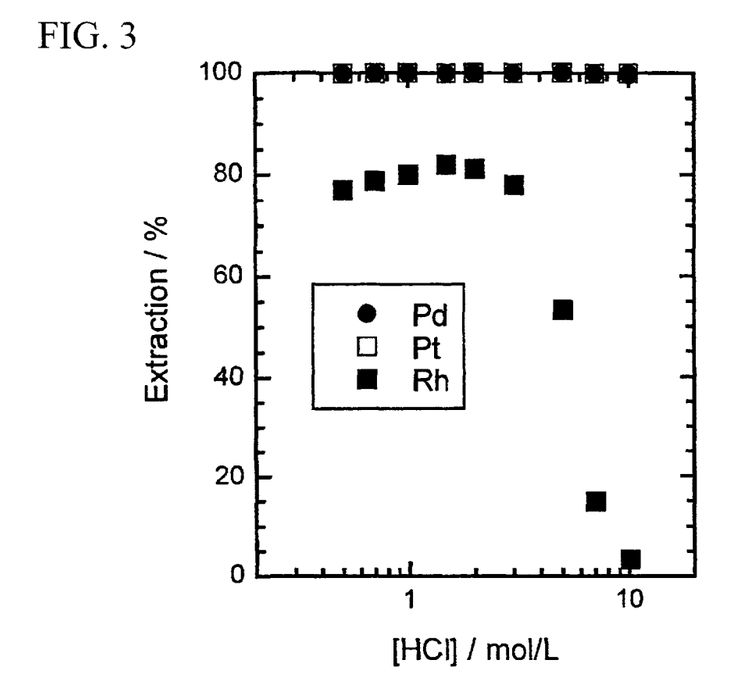
FIG. 3 is a graph showing dependence of an extraction % of platinum, palladium and rhodium on hydrochloric acid concentration with the reagent (A).

To the organic solvent, an equal volume of a hydrochloric acid solution containing platinum, palladium and rhodium (100 mg/L each) was added, and then the metals were extracted into the organic phase by vigorously shaking for 30 minutes. The extraction % was determined by measuring the metal concentration of the aqueous phase before and after the shaking using an ICP emission spectrometer. The dependence of the extraction % of platinum, palladium and rhodium on hydrochloric acid concentration is shown in FIG. 3.

The extraction % of palladium and platinum were nearly 100%. With respect to rhodium, a high extraction % (80% or more) was obtained at 1 to 2 mol/L hydrochloric acid. This extraction % is remarkably high among rhodium extraction from a chlorine-based acid solution which is often used in a wet refining field.

The organic phase after the extraction of palladium, platinum and rhodium from a 2 mol/L hydrochloric acid solution was separated and an equal volume of a 10 mol/L hydrochloric acid solution was added to the organic phase, followed by shaking for 30 minutes to back-extract the extracted metals. The back extraction % is shown in Table 1.

Palladium and platinum are scarcely separated from the organic phase because their back extraction % are very low. In contrast, a back extraction % of rhodium was about 90%.

TABLE 1

|  | Back extraction (%) |
| --- | --- |
| Palladium | <1 |
| Platinum | <1 |
| Rhodium | 90 |

The organic phase after back extraction of rhodium was separated and an equal volume of a 10 mol/L nitric acid solution was added to the organic phase, followed by shaking for 30 minute to back-extract the extracted metals. The back extraction % of palladium, platinum and rhodium are shown in Table 2.

The back extraction % of palladium and rhodium were about 80% and 90% respectively, which are high values. The back extraction % of platinum was about 40%, although it is smaller than those of palladium and rhodium.

TABLE 2

|  | Back extraction (%) |
| --- | --- |
| Palladium | 80 |
| Platinum | 40 |
| Rhodium | 90 |

Based on the above results, it is possible to conclude that palladium, platinum and rhodium can be extracted from a hydrochloric acid solution of each metal ion in which palladium, platinum and rhodium coexist by bringing the solution into contact with an organic phase containing the reagent, and that rhodium can be selectively recovered by bringing the organic phase into contact with a highly-concentrated hydrochloric acid solution, and also platinum and palladium can be recovered by bringing the resultant organic phase into contact with a highly-concentrated nitric acid solution. Therefore, the above reagent is a separation reagent which can separate and recover rhodium at a high extraction % from a hydrochloric acid solution, which has never existed heretofore, and it is possible to conclude that rhodium can be recovered at an earlier stage when compared with platinum and palladium by using the separation reagent.

Example 3

Figure 4:
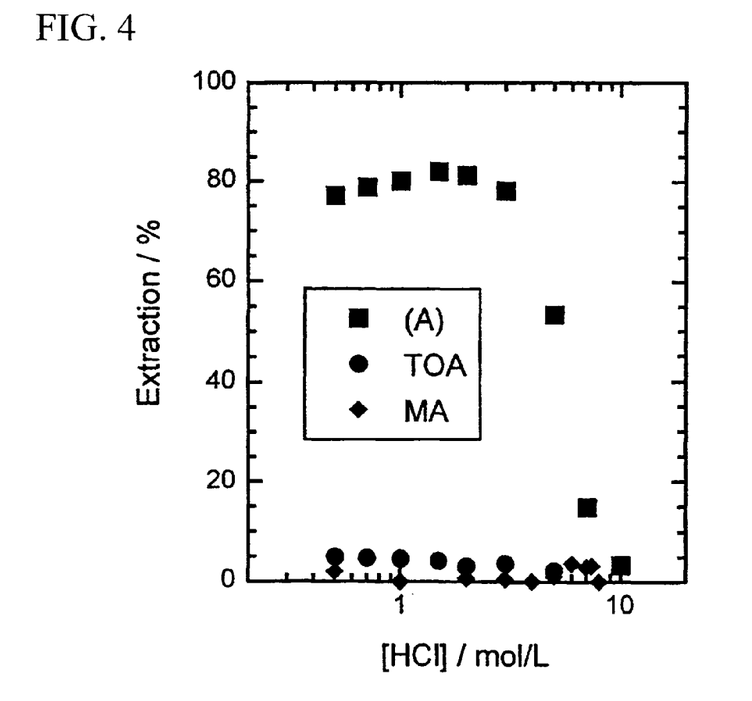
FIG. 4 is a graph showing a comparison of the extraction % of rhodium using the reagent (A) with that using the other extractants.

Tri-n-octylamine (TOA) (($n$-$C_8H_{17}$)$_3$N) as a kind of a tertiary amine and N,N'-dimethyl-N,N'-diphenyl-malonamide having two amide groups (MA) ($\{C_6H_5(CH_3)NC(O)\}_2CH_2$) were compared with the above reagent (A) with respect to a rhodium extraction %. Any extractant was diluted with chloroform to adjust the concentration to 0.5 mol/L. An extraction test and measurement of the extraction % were performed in the same manner as in Example 2. A comparison in the rhodium extraction % using the reagent (A) with that using other extractants is shown in FIG. 4.

In a concentration of hydrochloric acid of 3 mol/L or less where the reagent (A) can efficiently extract rhodium, TOA and MA scarcely extract rhodium and their rhodium extraction % are less than 5%.

Example 4

Synthesis of Separation Reagent

A separation reagent (B): N,N-di-n-hexyl-(N-methyl-N-n-octyl-ethylamide)amine (amide-containing tertiary amine represented by general formula (I) shown above in which $R_1=R_4R_5NC(O)R_6$, $R_2=R_3=$n-$C_6H_{13}$, $R_4=CH_3$, $R_5=$n-$C_8H_{17}$, and $R_6=CH_2$) was synthesized by the method shown below with reference to Non-Patent Document 1.

N-methyl-N-octyl-chloroacetamide in chloroform obtained in the same manner as in Example 1 was added dropwise to a chloroform solution containing N,N-di-n-hexylamine and triethylamine. The mixture was stirred at room temperature for 66 hours, and then stirred at 55° C. for 15 hours. The resulting solution was successively washed with water and then dried over anhydrous sodium sulfate. After removal of the solvent under vacuum, the residue was added dropwise to hexane and, after stirring for 30 minutes, the mixture was allowed to stand at room temperature. The precipitated white crystal was removed by filtration and the filtrate was concentrated. The resultant concentrate was purified by silica gel column chromatography (hexane:ethyl acetate=97:3) to give a separation reagent (B).

The analytical results of the resultant separation reagent (B) are shown below.

IR (neat, vcm$^{-1}$): 1650 (C=O).
Elementary analysis: Found: C=74.12%; H=13.02%; N=7.55%.
Calculated for $C_{23}H_{48}N_2O \cdot \frac{1}{4}H_2O$: C=74.03%; H=13.10%; N=7.51%.
1H-NMR (400 MH$_z$, CDCl$_3$, σppm): 0.88 (9H, 3CH$_2$CH$_3$); 1.2 to 1.4 (22H, CONC$_2$H$_4$C$_5$H$_{10}$CH$_3$ and 2NC$_2$H$_5$C$_3$H$_6$CH$_3$); 1.4 to 1.6 (6H, 2CH$_2$NCH$_2$CH$_2$CH$_2$ and CONCH$_2$CH$_2$CH$_2$); 2.47 (4H, 2CH$_2$NCH$_2$CH$_2$); 2.9 and 3.1 (3H, NCH$_3$); 3.25 (2H, CONCH$_2$CH$_2$); 3.33 and 3.42(2H, NCH$_2$CO).

A separation reagent (C): tris(N-methyl-N-n-octyl-ethylamide)amine (amide-containing tertiaryamine represented by general formula (I) shown above in which $R_1=R_2=R_3=R_4R_5NC(O)R_6$, $R_4=CH_3$, $R_5=$n-$C_8H17$, and R6=CH2) was synthesized by the method shown below with reference to Journal of Molecular Structure, Vol. 657, pp. 177-183 (2003), the disclosure of which is incorporated by reference herein.

Oxalyl chloride was added dropwise to nitrilotriacetic acid in benzene which contains a trace amount of dimethylformamide. After the mixture was stirred at room temperature for 6 hours, benzene and oxalyl chloride were removed under vacuum. The resulting solution was added to N-methyloctylamine in benzene, followed by stirring at 40° C. for 8 hours. The precipitate was filtered and the solvent was removed under vacuum. The crude product was purified by silica gel column chromatography (hexane:ethyl acetate=5:1) to give a separation reagent (C).

The analytical results of the resultant separation reagent (C) are shown below.

IR (neat, vcm$^{-1}$): 1645 (C=O).
Elementary analysis: Found: C=69.70%; H=11.77%; N=9.88%.
Calculated for $C_{33}H_{66}N_4O_3$: C=69.92%; H=11.74%; N=9.88%.
1H-NMR (400 MH$_z$, CDCl$_3$, σppm): 0.87 (9H, 3CH$_2$CH$_3$); 1.2 to 1.4 (30H, 3NC$_2$H$_4$C$_5$H$_{10}$CH$_3$); 1.5 (6H, 3CONCH$_2$CH$_2$CH$_2$); 2.9 and 3.1 (9H, 3NCH$_3$); 3.3 (6H, 3CONCH$_2$CH$_2$); 3.6 (6H, 3NCH$_2$CO).

Example 5

Using the separation reagents (B) and (C) obtained in Example 4, rhodium, platinum and palladium were separated in the following manner.

The above reagents (B) and (C) are respectively diluted with chloroform thereby adjusting to the concentration of 0.5 mol/L.

Figure 5:
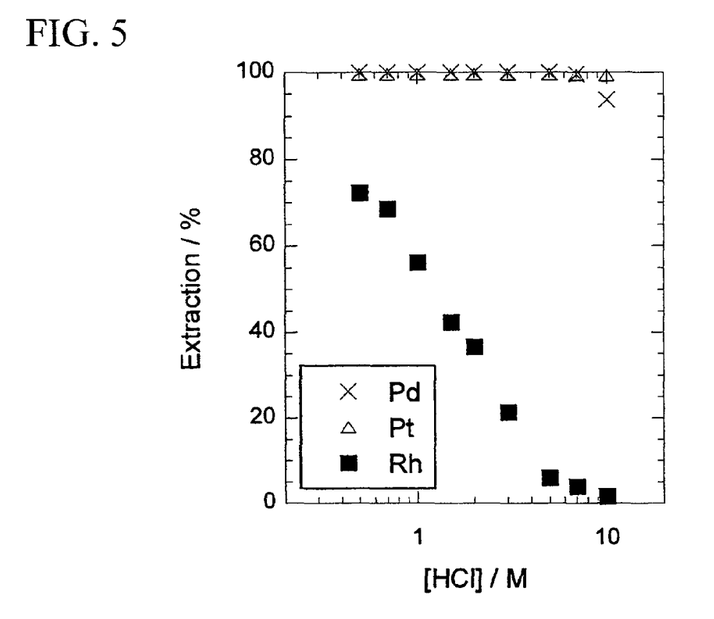
FIG. 5 is a graph showing dependence of an extraction % of platinum, palladium and rhodium on hydrochloric acid concentration with the reagent (B).
Figure 6:
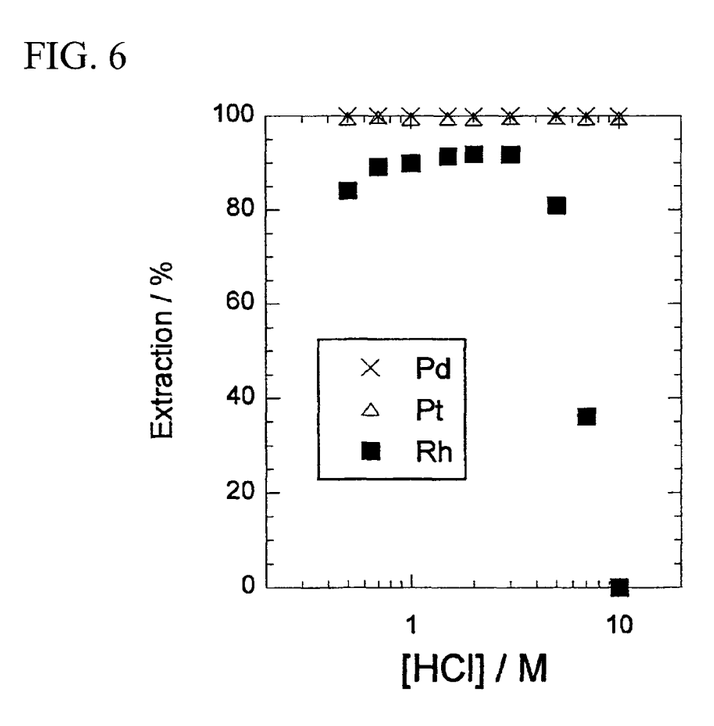
FIG. 6 is a graph showing dependence of an extraction % of platinum, palladium and rhodium on hydrochloric acid concentration with the reagent (C).

To the organic solvent, an equal volume of a hydrochloric acid solution containing platinum, palladium and rhodium (100 mg/L each) was added, and then the metals were extracted into the organic phase by vigorously shaking for 30 minutes. The extraction % was determined by measuring the metal concentration of the aqueous phase before and after the shaking using an ICP emission spectrometer. The dependence of the extraction % of platinum, palladium and rhodium on hydrochloric acid concentration using the reagents (B) and (C) is shown in FIG. 5 and FIG. 6, respectively.

The extraction % of palladium and platinum were almost 100% at the hydrochloric acid concentration of 0.5 to 10 mol/L. With respect to rhodium, although an extraction % of 70% or more was obtained at 0.5 mol/L hydrochloric acid using the reagent (B), the extraction % decreased as the hydrochloric acid concentration increases. When the separation reagent (C) is used, a remarkably high extraction % (90% or more) was obtained at 1 to 3 mol/L hydrochloric acid. This extraction % is remarkably high among rhodium extraction from a chlorine-based acid solution which is often used in the wet refining field.

The organic phase which extracted palladium, platinum and rhodium from a 2 mol/L hydrochloric acid solution was separated and an equal volume of a 10 mol/L hydrochloric acid solution was added to the organic phase, followed by shaking for 30 minute to back-extract the extracted metal. The back extraction % is shown in Table 3.

The back extraction % is the same in the reagents (B) and (C) and palladium and platinum are scarcely separated from the organic phase because their back extraction % were very low. In contrast, a high back extraction % (about 90%) was obtained in rhodium.

TABLE 3

| | Back extraction (%) | |
|---|---|---|
| | Reagent (B) | Reagent (C) |
| Palladium | <1 | <1 |
| Platinum | <1 | <1 |
| Rhodium | 90 | 90 |

The organic phase after the back extraction of rhodium was separated and an equal volume of a 10 mol/L nitric acid solution was added to the organic phase, followed by shaking for 30 minute to back-extract the extracted metals. The back extraction % of palladium, platinum and rhodium are shown in Table 4.

The back extraction % in the reagent (B) showed high values (80% for palladium, 60% for platinum and 100% for rhodium). In the reagent (C), the back extraction % showed a slightly small value (50% for palladium, 30% for platinum and 90% for rhodium).

TABLE 4

| | Back extraction (%) | |
|---|---|---|
| | Reagent (B) | Reagent (C) |
| Palladium | 80 | 50 |
| Platinum | 60 | 30 |
| Rhodium | 100 | 90 |

Example 6

Figure 7:
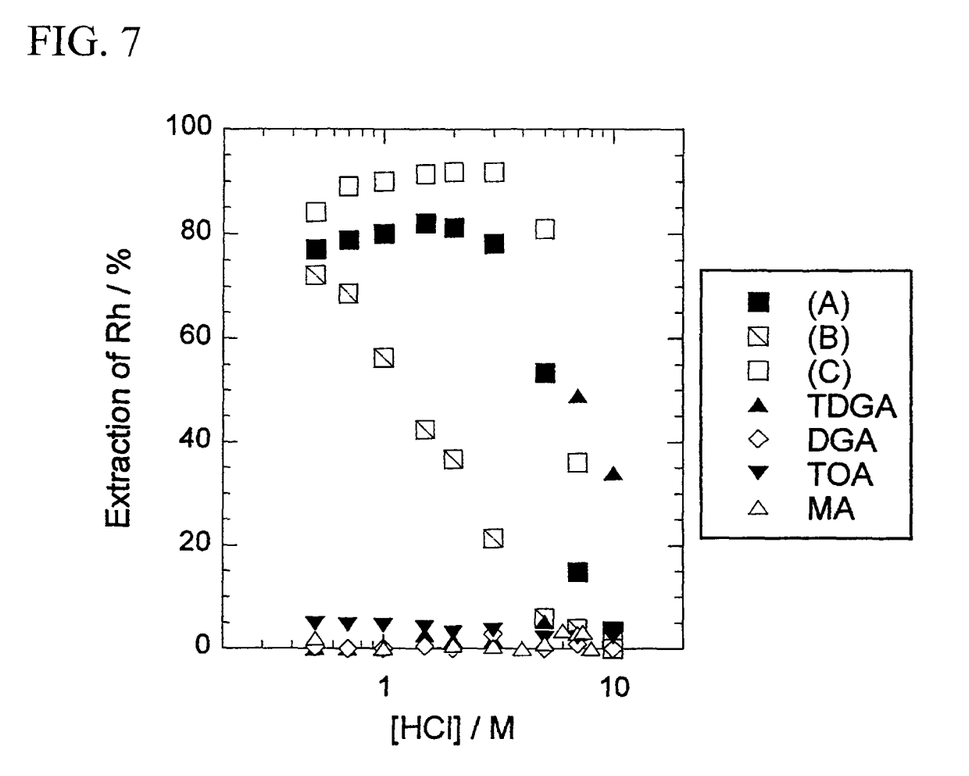
FIG. 7 is a graph showing a comparison of the extraction % of rhodium using the reagents (A), (B) and (C) with that using the other extractants.

Tri-n-octylamine (TOA) ((n-$C_8H_{17}$)$_3$N) as a kind of a tertiary amine and N,N'-dimethyl-N,N'-diphenyl-malonamide (MA) ({$C_6H_5$($CH_3$)NC(O)}$_2CH_2$), N,N'-dimethyl-N,N'-di-n-octyl-thiodiglycolamide (TDGA) ({n-$C_8H_{17}$($CH_3$)NC(O)$CH_2$}$_2$S), N,N'-dimethyl-N,N'-di-n-octyl-diglycolamide (DGA) ({n-$C_8H_{17}$($CH_3$)NC(O)$CH_2$}$_2$O), each having two amide groups, were compared with the above reagents (A), (B) and (C) with respect to a rhodium extraction %. Any extractant was diluted with chloroform to thereby adjust the concentration to 0.5 mol/L. An extraction test and measurement of an extraction % were performed in the same manner as in Example 5. A comparison in the rhodium extraction % using the reagents (A), (B) and (C) with that using other extractants are shown in FIG. 7.

The reagents (A), (B) and (C) can efficiently extract at 3 mol/L or less hydrochloric acid, while the rhodium extraction % of the other extractants are less than 5% except that TDGA extracts about 50% at about 7 mol/L hydrochloric acid.

As is apparent from the above results, it is difficult for a compound which is a tertiary amine and does not contain an amide group or a compound which contains an amide group but is not a tertiary amine to extract rhodium, and it is necessary that an extractant of rhodium be a tertiary amine containing an amide group.

Industrial Applicability

The present invention is expected as a separation reagent and a recovery method in a platinum group metal separating and purifying step in the metal refining field, and in the platinum group metal recycling industry for automobile exhaust gas purifying catalyst and spent electric appliances.

What is claimed is:

1. A method which comprises bringing a solution containing a platinum group metal into contact with an amide-containing tertiary amine compound to separate a platinum group metal.

2. The method according to claim 1, wherein the amide-containing tertiary amine compound is one represented by the general formula shown below:

[Chemical Formula 1]

wherein a least one of $R_1$, $R_2$ and $R_3$ represents an amide group represented by:

[Chemical Formula 2]

and $R_1$ to $R_3$ other than the amide group and $R_4$ to $R_6$ represent a group selected from an optionally branched chain hydrocarbon group of 1 to 18 carbon atoms, an alicyclic hydrocarbon group of 1 to 10 carbon atoms and an aromatic hydrocarbon group of 1 to 14 carbon atoms.

3. The method according to claim 2, wherein the solution containing a platinum group metal is an acidic aqueous phase containing rhodium, platinum and palladium, and the amide-containing tertiary amine compound is in an organic phase, thereby extracting rhodium, platinum and palladium into the organic phase.

4. A method for recovering rhodium, which comprises back-extracting rhodium, platinum and palladium extracted into the organic phase according to claim 3 with a highly-concentrated hydrochloric acid solution to obtain an aqueous solution containing rhodium.

5. A method for recovering rhodium, platinum and palladium, which comprises back-extracting rhodium, platinum and palladium extracted into the organic phase according to claim 3 with a highly-concentrated nitric acid solution to obtain an aqueous solution containing rhodium, platinum and palladium.

6. A method for separating and recovering rhodium, platinum and palladium wherein a platinum group metal is separated and recovered from a solution to be treated containing at least rhodium, platinum and palladium, the method comprising:
    a first step of bringing an acidic solution to be treated containing at least rhodium, platinum and palladium into contact with an organic phase containing the amide-containing tertiary amine compound, thereby separating rhodium, platinum and palladium from the acidic solution to be treated for extraction according to claim 3,
    a second step of bringing the resulting organic phase containing rhodium, platinum and palladium into contact with a highly-concentrated hydrochloric acid solution, thereby recovering rhodium,
    a third step of bringing a highly-concentrated nitric acid solution into contact with the organic phase after separation of rhodium, thereby recovering platinum and palladium, a fourth step of bringing an organic phase containing a thiodiglycolamide separation reagent into contact with the resultant aqueous solution containing platinum and palladium, thereby separating palladium and leaving platinum in the aqueous solution, and a fifth step of bringing a hydrochloric acid solution containing thiourea or an ammonia solution into contact with the resultant organic phase containing palladium, thereby recovering palladium.

7. A method for using an amide-containing tertiary amine compound for a reagent for separating a platinum group metal by contacting the reagent with a solution containing the platinum group metal.

8. The method according to claim 7, wherein the solution is an acidic solution.

9. The method according to claim 1, wherein the platinum group metal is rhodium.

10. The method according to claim 7, wherein the platinum group metal is rhodium.

* * * * *